(12) United States Patent
Takada

(10) Patent No.: US 10,418,896 B2
(45) Date of Patent: Sep. 17, 2019

(54) SWITCHING REGULATOR INCLUDING AN OFFSET ENABLED COMPARISON CIRCUIT

(71) Applicant: ABLIC Inc., Chiba-shi, Chiba (JP)

(72) Inventor: Kosuke Takada, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/032,338

(22) Filed: Jul. 11, 2018

(65) Prior Publication Data
US 2019/0020276 A1 Jan. 17, 2019

(30) Foreign Application Priority Data
Jul. 14, 2017 (JP) .................... 2017-137918

(51) Int. Cl.
| | | |
|---|---|---|
| *H02M 1/00* | (2006.01) | |
| *H02M 3/158* | (2006.01) | |
| *G05F 1/595* | (2006.01) | |
| *H02M 3/156* | (2006.01) | |
| *H02M 1/36* | (2007.01) | |

(Continued)

(52) U.S. Cl.
CPC ............... *H02M 3/156* (2013.01); *G05F 1/10* (2013.01); *G05F 1/46* (2013.01); *G05F 1/595* (2013.01); *H02M 1/36* (2013.01); *H02M 3/158* (2013.01); *H02M 2001/0025* (2013.01); *H02M 2001/0032* (2013.01); *H02M 2001/0041* (2013.01)

(58) Field of Classification Search
CPC ........... H02M 1/36; H02M 2001/0025; H02M 2001/0032; H02M 2001/0041; H02M 3/156; G05F 1/10; G05F 1/46; G05F 1/462; G05F 1/468; G05F 1/56; G05F 1/563; G05F 1/565; G05F 1/575; G05F 1/59; G05F 1/595

See application file for complete search history.

(56) References Cited

U.S. PATENT DOCUMENTS

| | | | | | |
|---|---|---|---|---|---|
| 6,127,815 A | * | 10/2000 | Wilcox | .................... | G05F 1/565 323/282 |
| 2003/0210025 A1 | * | 11/2003 | Ishii | ...................... | H02M 3/158 323/284 |

(Continued)

FOREIGN PATENT DOCUMENTS

| | | |
|---|---|---|
| JP | 2007-259599 | 10/2007 |
| JP | 2010-068671 | 3/2010 |

*Primary Examiner* — Yusef A Ahmed
*Assistant Examiner* — David A. Singh
(74) *Attorney, Agent, or Firm* — Brinks Gilson & Lione

(57) ABSTRACT

A switching regulator includes: an error amplification circuit configured to amplify a difference between a voltage based on the output voltage and a first reference voltage to output an error voltage; a PFM comparison circuit configured to compare the error voltage with a second reference voltage to output a comparison result signal at a first level or a second level, an offset being given to the error voltage for a given period in response to a change of the comparison result signal from the second level to the first level; an oscillation circuit configured to output a clock signal of a given frequency according to the first level of the comparison result signal, and to stop outputting the clock signal according to the second level of the comparison result signal; and a PWM conversion circuit configured to turn the switching element on at a prescribed pulse width.

8 Claims, 6 Drawing Sheets

(51) Int. Cl.
*G05F 1/10* (2006.01)
*G05F 1/46* (2006.01)

(56) References Cited

U.S. PATENT DOCUMENTS

| | | | | |
|---|---|---|---|---|
| 2004/0095105 A1* | 5/2004 | Nakata | ...................... | G05F 1/56 323/280 |
| 2006/0125454 A1* | 6/2006 | Chen | ................... | H02M 3/1588 323/282 |
| 2006/0198170 A1* | 9/2006 | Kasai | .................. | H02M 3/1582 363/40 |
| 2007/0001655 A1* | 1/2007 | Schiff | ................... | H02M 3/158 323/246 |
| 2007/0247131 A1 | 10/2007 | Sohma | | |
| 2008/0024100 A1* | 1/2008 | Huang | .................. | H02M 3/158 323/282 |
| 2008/0136383 A1* | 6/2008 | Hasegawa | ........... | H02M 3/1588 323/271 |
| 2008/0252273 A1* | 10/2008 | Woo | ........................ | H02M 1/34 323/280 |
| 2009/0315523 A1* | 12/2009 | Kumagai | .............. | H02M 3/156 323/272 |
| 2010/0046250 A1* | 2/2010 | Noda | .................. | H02M 3/1588 363/16 |
| 2010/0066328 A1* | 3/2010 | Shimizu | .............. | H02M 3/1588 323/282 |
| 2010/0315057 A1* | 12/2010 | Zambetti | ................ | H02M 3/156 323/284 |
| 2011/0115456 A1* | 5/2011 | Tanifuji | ................ | H02M 3/156 323/283 |
| 2011/0193539 A1* | 8/2011 | Schmidt | ................ | H02M 3/156 323/282 |
| 2012/0081085 A1* | 4/2012 | Miyamae | .............. | H02M 3/156 323/271 |
| 2012/0091981 A1* | 4/2012 | Komiya | ................ | H02M 3/156 323/282 |
| 2012/0105029 A1* | 5/2012 | Kawagoe | .............. | H02M 3/156 323/271 |
| 2012/0146594 A1* | 6/2012 | Kobayashi | .......... | H02M 3/1582 323/234 |
| 2013/0038301 A1* | 2/2013 | Ouyang | ................ | H02M 3/156 323/271 |
| 2013/0335046 A1* | 12/2013 | Huang | .................. | H02M 3/156 323/282 |
| 2015/0137776 A1* | 5/2015 | Thomas | .............. | H02M 3/1588 323/271 |
| 2015/0222180 A1* | 8/2015 | Deguchi | ................ | H02M 3/156 323/282 |
| 2016/0306371 A1* | 10/2016 | Svorc | .................. | H02M 3/1588 |
| 2017/0019026 A1* | 1/2017 | Nien | ................... | H02M 3/1584 |

\* cited by examiner

SWITCHING REGULATOR INCLUDING AN OFFSET ENABLED COMPARISON CIRCUIT

RELATED APPLICATIONS

This application claims priority under 35 U.S.C. § 119 to Japanese Patent Application No. 2017-137918 filed on Jul. 14, 2017, the entire content of which is hereby incorporated by reference.

BACKGROUND OF THE INVENTION

1. Field of the Invention

The present invention relates to a switching regulator.

2. Description of the Related Art

A circuit diagram of a switching regulator 500 of the related art is illustrated in FIG. 5.

The switching regulator 500 of the related art includes a power supply terminal 501, a ground terminal 502, a reference voltage source 510, an error amplification circuit 511, a reference voltage source 512, a PFM comparison circuit 513, an oscillation circuit 514, a PMOS transistor 530, an NMOS transistor 531, an inductor 540, a capacitor 541, resistors 543 and 544, an output terminal 542, and a PWM conversion circuit 550 which includes a current-voltage conversion circuit 520, a slope voltage generation circuit 521, a PWM comparison circuit 522, a control circuit 523, and a reverse flow detection circuit 524. The switching regulator 500 is configured by connecting the components in the manner illustrated in FIG. 5.

The error amplification circuit 511 compares a voltage VFB which is created by dividing an output voltage VOUT of the output terminal 542 between the resistor 543 and the resistor 544 with a reference voltage VREF1 of the reference voltage source 510, and outputs an error voltage VERR.

The current-voltage conversion circuit 520 converts a source current of the PMOS transistor 530 into a voltage, and outputs the voltage to the slope voltage generation circuit 521. The slope voltage generation circuit 521 adds a saw-tooth wave to the output from the current-voltage conversion circuit 520, and outputs a voltage VCS. The PWM comparison circuit 522 compares the error voltage VERR with the voltage VCS, and outputs a comparison result signal CMPW to the control circuit 523.

The PFM comparison circuit 513 compares the error voltage VERR with a reference voltage VREF2 of the reference voltage source 512, and outputs a comparison result signal CMPF to the oscillation circuit 514. The oscillation circuit 514 oscillates at a given frequency (enabled) and outputs a clock signal as an output signal CLK according to low level of the comparison result signal CMPF. And the oscillation circuit 514 stops oscillation (disabled), and fixes the output signal CLK at low level according to high level of the comparison result signal CMPF.

The reverse flow detection circuit 524 compares a drain voltage with a source voltage of the NMOS transistor 531 and outputs a reverse current detection signal to the control circuit 523 at the detection of the drain voltage being higher than the source voltage.

The control circuit 523 controls the turning on/off of the PMOS transistor 530 and the NMOS transistor 531 in accordance with input signals.

The inductor 540 and the capacitor 541 form a smoothing circuit for a voltage VSW supplied from the drain of the PMOS transistor 530.

A negative feedback loop functions with this configuration, and the switching regulator 500 operates so as to make the voltage VFB equal to the reference voltage VREF1, and generates the output voltage VOUT at the output terminal 542.

The switching regulator 500 switches between pulse width modulation (PWM) operation and pulse frequency modulation (PFM) operation as follows according to the magnitude of the current flowing through the load connected to the output terminal 542 (a load current).

In case of the large load current the error voltage VERR rises so as to compensate for a drop in output voltage VOUT. The error voltage VERR is hence constantly higher than the reference voltage VREF2, and the oscillation circuit 514 keeps output of the clock signal of a given frequency as the output signal CLK. In synchronization with the rise of the clock signal, the PWM conversion circuit 550 turns the PMOS transistor 530 on and turns the NMOS transistor 531 off. The PWM conversion circuit 550 at this point determines the pulse width of a signal for controlling the time interval for tuning on of the PMOS transistor 530. The switching regulator 500 is thus in PWM operation for the large load current.

In the subsequent decrease of the load current from the state described above, the error voltage VERR is still constantly higher than the reference voltage VREF2 immediately after the load current decreases. However, since a drop in the output voltage VOUT caused by the small load current is small, increase of the output voltage VOUT becomes high by turning on of the PMOS transistor 530. The error voltage VERR accordingly decreases so as to compensate for the rise of the output voltage VOUT, and reaches a voltage lower than the reference voltage VREF2. The PMOS transistor 530 is consequently turned off and the output voltage VOUT decreases.

The error voltage VERR rises and exceeds the reference voltage VREF2, then the oscillation circuit 514 supplies a clock signal as the output signal CLK. In synchronization with the rise of the clock signal, the PWM conversion circuit 550 turns the PMOS transistor 530 on and turns the NMOS transistor 531 off. The turning on of the PMOS transistor 530 causes the output voltage VOUT to exceed the prescribed voltage value in a short time because the load current at this point is small, with the result that the error voltage VERR decreases. Then the PWM conversion circuit 550 turns the PMOS transistor 530 off and the NMOS transistor 531 on. The oscillation circuit 514 fixes the output signal CLK at low level. The oscillation circuit 514 thus repeats oscillation and cessation, in other words, the switching regulator 500 is in PFM operation for the small load current.

As described above, the switching regulator 500 of the related art employs a method involving switching between the PWM operation and the PFM operation depending on the result of comparison of the error voltage VERR with the reference voltage VREF2 so that power conversion efficiency can be improved by shifting to the PFM operation for the small load current (see, for example, Japanese Patent Application Laid-open No. 2010-68671).

However, in the switching regulator 500 of the related art described above increase of a ripple voltage in the output voltage VOUT is caused by occurrence of a plurality of successive switching operation of the PMOS transistor 530 during the PFM operation.

The cause of the successive switching operation is that a response delay of the PFM comparison circuit 513 delays timing at which the oscillation circuit 514 is disabled, thereby causing the oscillation circuit 514 to output a clock signal a plurality of times.

The cause is described in detail below with reference to FIG. 6.

FIG. 6 is a diagram for illustrating the waveforms of an inductor current IL which flows in the inductor 540, the output voltage VOUT, the voltage VFB, the error voltage VERR, the comparison result signal CMPF, and the output signal CLK of the oscillation circuit 514 in the switching regulator 500 of the related art.

At time t0, the comparison result signal CMPF is at high level and the PMOS transistor 530 stops the switching operation. The voltage VFB decreases as the output voltage VOUT decreases. The voltage VFB becomes lower than the reference voltage VREF1, then the error voltage VERR starts rising. At time t1, the error voltage VERR exceeds the reference voltage VREF2 and the comparison result signal CMPF switches to low level which causes an output of a clock signal as the signal CLK, turns on the PMOS transistor 530, and causes flow of the inductor current IL. This raises the output voltage VOUT until the output voltage VOUT exceeds a prescribed voltage value VTG, then the error voltage VERR starts dropping.

At time t2, the error voltage VERR decreases lower than the reference voltage VREF2. The comparison result signal CMPF at this point does not switch to high level immediately, due to the response delay of the PFM comparison circuit 513 mentioned above, and switches to high level at time t3 after elapse of a delay time td from the time t2. An unnecessary clock signal CLK is consequently provided between the time t2 and the time t3, thereby causing the PMOS transistor 530 to perform an unnecessary switching operation. The ripple voltage in the output voltage VOUT consequently increases.

The start of the drop of the error voltage VERR following the exceedance of the error voltage VERR over the reference voltage VREF2 can be advanced by setting the inductor 540, the capacitor 541, and others to have a sharp rise of the output voltage VOUT. This advances the switch of the comparison result signal CMPF to high level as well, and the unnecessary output of a clock signal can accordingly be prevented. However, the sharp rise of the output voltage VOUT widens the extent of the rise of the output voltage VOUT that is caused by executing the switching operation of the PMOS transistor 530 once, with the result that the ripple voltage increases.

SUMMARY OF THE INVENTION

The present invention has been made to provide a switching regulator capable of reducing a ripple voltage in an output voltage in PFM operation.

According to an embodiment of the present invention a switching regulator which controls a switching element connected between a power supply terminal and one end of an inductor, and configured to generate an output voltage at an output terminal to which another end of the inductor is connected, from a power supply voltage supplied to a power supply terminal, the switching regulator includes:

an error amplification circuit configured to amplify a difference between a voltage based on the output voltage and a first reference voltage to output an error voltage;

a PFM comparison circuit configured to compare the error voltage with a second reference voltage to output a comparison result signal at one of a first level and a second level, an offset being given to an input to the PFM comparison circuit for a given period in response to a change of the comparison result signal from the second level to the first level;

an oscillation circuit configured to output a clock signal of a given frequency according to the first level of the comparison result signal, and to stop outputting the clock signal according to the second level of the comparison result signal; and a PWM conversion circuit configured to turn the switching element on at a prescribed pulse width, based on the error voltage and on the output from the oscillation circuit.

According to the switching regulator of the present invention, an offset is provided to the input of the PFM comparison circuit for a given period so that the effect of compensation for a response delay of the PFM comparison circuit is obtained, preventing unnecessary operation of the switching element during PFM operation. A ripple voltage in the output voltage can accordingly be reduced.

DETAILED DESCRIPTION OF THE EMBODIMENTS

Embodiments of the present invention are described with reference to accompanying drawings.

Figure 1:
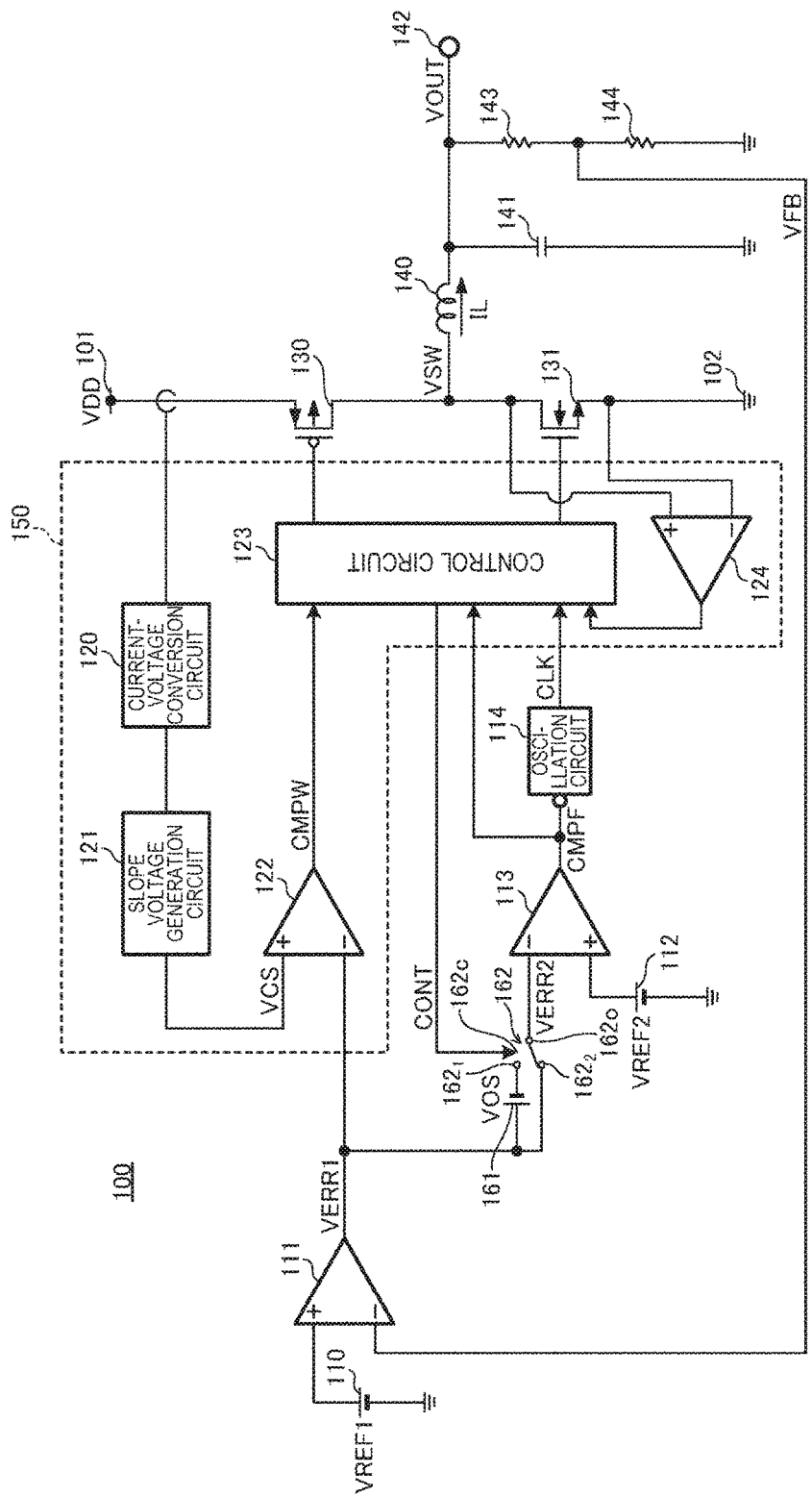
FIG. 1 is a circuit diagram for illustrating a switching regulator according to the first embodiment of the present invention.

FIG. 1 is a circuit diagram for illustrating a switching regulator 100 according to the first embodiment of the present invention.

The switching regulator 100 according to the first embodiment includes a power supply terminal 101, a ground terminal 102, a reference voltage source 110, an error amplification circuit 111, a reference voltage source 112, a PFM comparison circuit 113, an oscillation circuit 114, a PMOS transistor 130 (also referred to as "switching element"), an NMOS transistor 131 (also referred to as "synchronous rectification element"), an inductor 140, a capacitor 141, resistors 143 and 144, an output terminal 142, a PWM conversion circuit 150 which includes a current-voltage conversion circuit 120, a slope voltage generation circuit 121, a PWM comparison circuit 122, a control circuit 123, and a reverse flow detection circuit 124, an offset voltage source 161 which is a constant voltage source, and a switch 162 which includes a terminal 162o, a first terminal $162_1$, a second terminal $162_2$, and a control terminal 162c.

The reference voltage source 110 is connected at one end to a non-inverting input terminal of the error amplification circuit 111, and is connected at the other end to the ground terminal 102. In the error amplification circuit 111, an inverting input terminal is connected to a node of the resistor 143 and the resistor 144, and an output is connected to an inverting input terminal of the PWM comparison circuit 122, one end of the offset voltage source 161, and the second terminal $162_2$ of the switch 162. In the switch 162, the first terminal $162_1$ is connected to the other end of the offset voltage source 161, the terminal 162o is connected to an inverting input terminal of the PFM comparison circuit 113, and the control terminal 162c is connected to an output of the control circuit 123. The reference voltage source 112 is connected at one end to a non-inverting input terminal of the PFM comparison circuit 113, and is connected at the other end to the ground terminal 102. An output of the PFM comparison circuit 113 is connected to an input of the oscillation circuit 114 and an input of the control circuit 123. An output of the oscillation circuit 114 is connected to the input of the control circuit 123.

In the slope voltage generation circuit 121, an input is connected to an output of the current-voltage conversion circuit 120, and an output is connected to a non-inverting input terminal of the PWM comparison circuit 122. An output of the PWM comparison circuit 122 is connected to the input of the control circuit 123. In the PMOS transistor 130, a source is connected to the power supply terminal 101 and an input of the current-voltage conversion circuit 120, a gate is connected to the output of the control circuit 123, and a drain is connected to one end of the inductor 140, a non-inverting input terminal of the reverse flow detection circuit 124, and a drain of the NMOS transistor 131. In the NMOS transistor 131, a gate is connected to the output of the control circuit 123 and a source is connected to the ground terminal 102. In the reverse flow detection circuit 124, an inverting input terminal is connected to the ground terminal 102, and an output is connected to the input of the control circuit 123.

The other end of the inductor 140 is connected to one end of the capacitor 141, one end of the resistor 143, and the output terminal 142. The other end of the capacitor 141 is connected to the ground terminal 102. The other end of the resistor 144 is connected to the ground terminal 102.

The operation of the thus configured switching regulator 100 is described below.

The error amplification circuit 111 compares a voltage VFB which is created by dividing an output voltage VOUT of the output terminal 142 between the resistor 143 and the resistor 144 with a reference voltage VREF1 of the reference voltage source 110, and outputs an error voltage VERR1.

The current-voltage conversion circuit 120 converts a source current of the PMOS transistor 130 into a voltage, and outputs the voltage to the slope voltage generation circuit 121. The slope voltage generation circuit 121 adds a saw-tooth wave to the output from the current-voltage conversion circuit 120, and outputs a voltage VCS. The PWM comparison circuit 122 compares the error voltage VERR1 and the voltage VCS to output a comparison result signal CMPW to the control circuit 123.

In the switch 162, the terminal 162o is connected to one of the first terminal $162_1$ and the second terminal $162_2$ depending on a control signal CONT which is provided from the control circuit 123 to the control terminal 162c. During connection of the terminal 162o of the switch 162 to the first terminal $162_1$, a voltage VERR2 provided to the inverting input terminal of the PFM comparison circuit 113 is a voltage obtained by adding an offset voltage VOS (a negative voltage) of the offset voltage source 161 to the error voltage VERR1. During connection of the terminal 162o to the second terminal $162_2$, the voltage VERR2 input to the inverting input terminal of the PFM comparison circuit 113 is the error voltage VERR1. The terminal 162o of the switch 162 is normally connected to the second terminal $162_2$ which makes the error voltage VERR1 and the voltage VERR2 the same voltage.

The PFM comparison circuit 113 compares the voltage VERR2 with a reference voltage VREF2 of the reference voltage source 112, and outputs a comparison result signal CMPF to the oscillation circuit 114. By the comparison result signal CMPF at low level, the oscillation circuit 114 oscillates at a given frequency (enabled) and outputs a clock signal as an output signal CLK. By the comparison result signal CMPF at high level, the oscillation circuit 114 stops oscillation (disabled), and fixes the output signal CLK at low level.

The reverse flow detection circuit 124 compares a drain voltage with a source voltage of the NMOS transistor 131 and outputs a reverse current detection signal to the control circuit 123 at the detection of the drain voltage being higher than the source voltage.

The control circuit 123 controls the turning on/off of the PMOS transistor 130 and the NMOS transistor 131 in accordance with input signals.

The inductor 140 and the capacitor 141 form a smoothing circuit for a voltage VSW supplied from the drain of the PMOS transistor 130.

A negative feedback loop functions with this configuration, and the switching regulator 100 operates so as to make the voltage VFB equal to the reference voltage VREF1, and generates the output voltage VOUT at the output terminal 142.

The switching regulator 100 switches between pulse width modulation (PWM) operation and pulse frequency modulation (PFM) operation as follows according to the magnitude of a current flowing through the load (not shown) connected to the output terminal 142 (a load current).

In the large load current the error voltage VERR1 (i.e., the voltage VERR2) rises so as to compensate for a drop in output voltage VOUT. The error voltage VERR1 is hence constantly higher than the reference voltage VREF2, and the oscillation circuit 114 keeps output of the clock signal of a given frequency as the output signal CLK. In synchronization with the rise of the clock signal, the PWM conversion circuit 150 turns the PMOS transistor 130 on and turns the NMOS transistor 131 off. The PWM conversion circuit 150 at this point determines the pulse width of a signal for controlling the time interval for turning on of the PMOS transistor 130. The switching regulator 100 is thus in PWM operation for the large load current.

In the subsequent decrease of the load current from the state described above, the error voltage VERR1 is still constantly higher than the reference voltage VREF2 immediately after the load current decreases. However, since a drop in the output voltage VOUT caused by the small load current is small, increase of the output voltage VOUT becomes high by turning on of the PMOS transistor 130. The error voltage VERR1 accordingly decreases so as to compensate for the rise of the output voltage VOUT, and reaches a voltage lower than the reference voltage VREF2. The PMOS transistor 130 is consequently turned off and the output voltage VOUT decreases.

The error voltage VERR1 rises and exceeds the reference voltage VREF2, then the oscillation circuit 114 supplies a clock signal as the output signal CLK. In synchronization with the rise of the clock signal, the PWM conversion circuit 150 turns the PMOS transistor 130 on and turns the NMOS transistor 131 off. The turning on of the PMOS transistor 130 causes the output voltage VOUT to exceed the prescribed voltage value in a short time because the load current at this point is small, with the result that the error voltage VERR1 decreases. Then the PWM conversion circuit 150 turns the PMOS transistor 130 off and the NMOS transistor 131 on. The oscillation circuit 114 fixes the output signal CLK at low level. The oscillation circuit 114 thus repeats oscillation and cessation, in other words, the switching regulator 100 is in PFM operation for the small load current.

In this manner, the switching regulator 100 according to the first embodiment can improve power conversion efficiency by shifting to the PFM operation for the small load current.

The circuit operation of the switching regulator 100 in PFM operation is described in detail below in order to describe the characteristic configuration of the switching regulator 100 according to the first embodiment.

Figure 2:
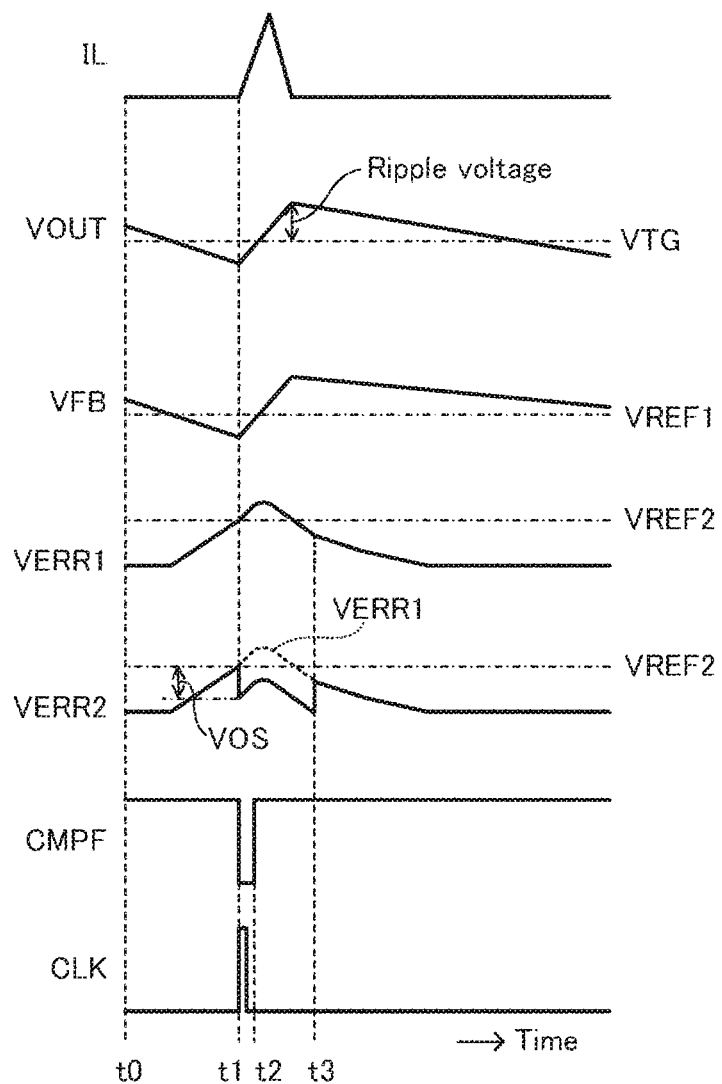
FIG. 2 is a diagram for illustrating the signal waveforms of nodes in the switching regulator of FIG. 1.

FIG. 2 is a diagram for illustrating waveforms of an inductor current IL, the output voltage VOUT, the voltage VFB, the error voltage VERR1, the voltage VERR2, the comparison result signal CMPF, and the output signal CLK of the oscillation circuit 114 in the switching regulator 100 according to the first embodiment.

At time t0, the comparison result signal CMPF is at high level and the PMOS transistor 130 stops the switching operation and is turned off. With the comparison result signal CMPF being at high level, the switch 162 connects the terminal 162o to the second terminal 162$_2$ in accordance with the control signal CONT which is provided from the control circuit 123 to the control terminal 162c. The output voltage VOUT decreases because the PMOS transistor 130 is turned off, and the voltage VFB accordingly decreases as well. The voltage VFB becomes lower than the reference voltage VREF1, then the error voltage VERR1 starts rising.

At time t1, the error voltage VERR1 exceeds the reference voltage VREF2, triggering an inversion of the comparison result signal CMPF to low level, and the oscillation circuit 114 accordingly outputs a clock signal as the output signal CLK. The control circuit 123 receives the clock signal and turns on the PMOS transistor 130, thereby causing flow of the inductor current IL. At the same time, the control circuit 123 inverts the control signal CONT in response to the inversion of the comparison result signal CMPF to low level. This causes the switch 162 to switch the connection of the terminal 162o from the second terminal 162$_2$ to the first terminal 162$_1$. The voltage VERR2 consequently decreases lower than the error voltage VERR1 by an amount of the voltage VOS.

At time t2, the PFM comparison circuit 113 detects the drop of the voltage VERR2, and inverts the comparison result signal CMPF to high level.

At time t3 subsequently after elapse of a given period from the time t1 at which the comparison result signal CMPF has been inverted to low level, the control circuit 123 inverts the control signal CONT again. In response to the inversion, the switch 162 switches the connection of the terminal 162o from the first terminal 162$_1$ to the second terminal 162$_2$, making the voltage VERR2 equal to the error voltage VERR1 once again.

In this manner, the PFM comparison circuit 113 can change the comparison result signal CMPF to high level at a time that precedes the time at which the error voltage VERR1 decreases lower than the reference voltage VREF2, by lowering the voltage VERR2 by the amount of the voltage VOS, in other words, by providing an offset to the inverting input terminal of the PFM comparison circuit 113 at time t1. This is equivalent to the compensation for a response delay of the PFM comparison circuit 113. An unnecessary output of a clock signal as the signal CLK after the output of a clock signal at time t1 from the oscillation circuit 114 can be prevented as a result. Absence of unnecessary switching operation of the PMOS transistor 130 can prevent increase of the ripple voltage in the output voltage VOUT.

While a constant voltage source is used as the offset voltage source 161 in the first embodiment, a resistor and a current source may be used instead of the constant voltage source. The configuration of the offset voltage source 161 is not particularly limited as long as a constant voltage can be generated.

Figure 3:
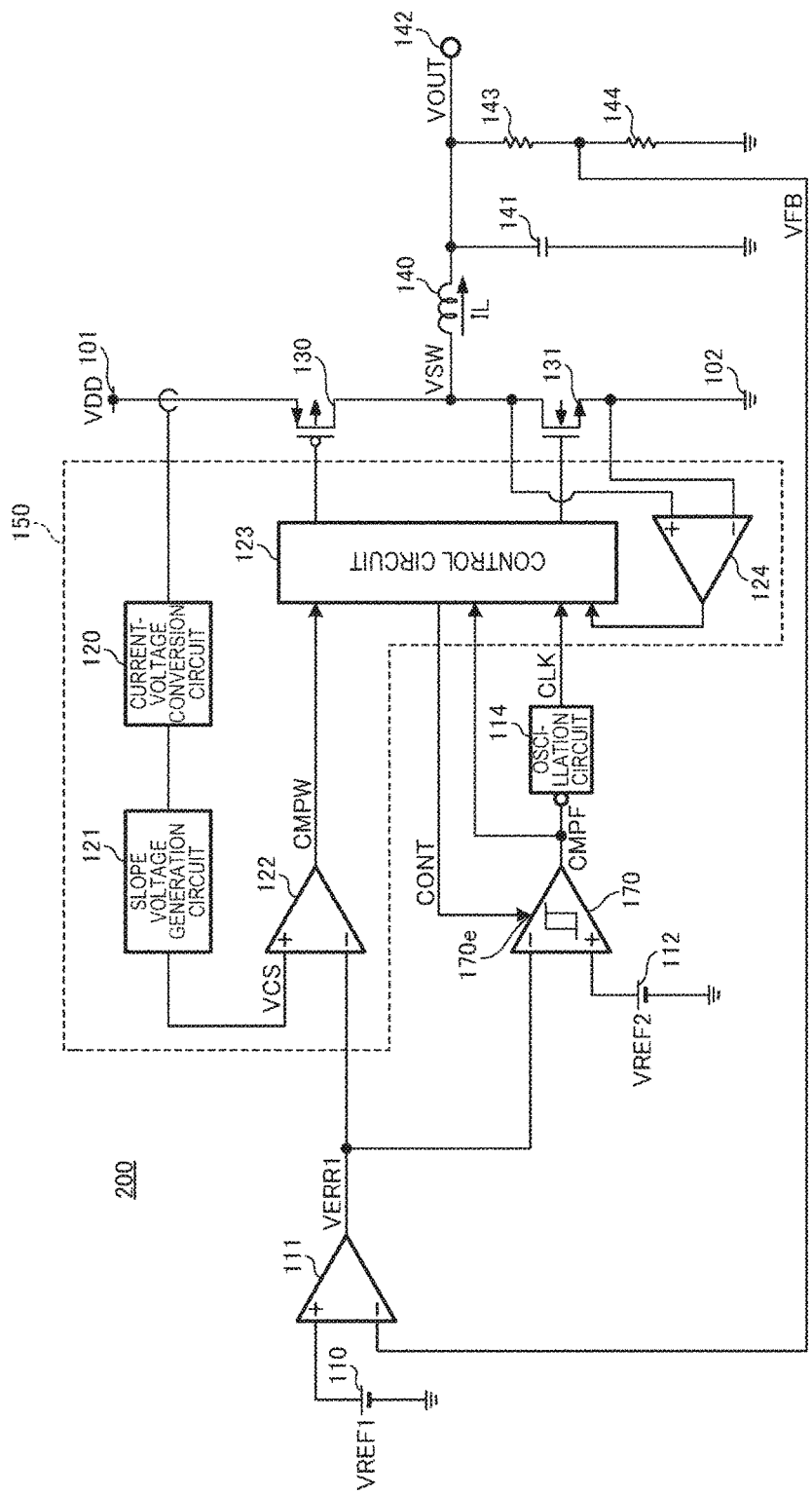
FIG. 3 is a circuit diagram for illustrating a switching regulator according to the second embodiment of the present invention.

A switching regulator 200 according to the second embodiment of the present invention is described next with reference to FIG. 3.

The switching regulator 200 according to the second embodiment is configured by removing the offset voltage source 161 and the switch 162 from the switching regulator 100 according to the first embodiment and replacing the PFM comparison circuit 113 with a PFM comparison circuit 170 with hysteresis.

The rest of the configuration of the switching regulator 200 is the same as that of the switching regulator 100 of FIG. 1, and the same components are therefore denoted by the same reference symbols to omit duplicate descriptions as appropriate.

In the PFM comparison circuit 170, an inverting input terminal is connected to the output of the error amplification circuit 111 and the inverting input terminal of the PWM comparison circuit 122, a non-inverting input terminal is connected to one end of the reference voltage source 112, an output is connected to the input of the oscillation circuit 114, and a hysteresis enable terminal 170e is connected to the output of the control circuit 123.

A description is given below on the operation of the switching regulator 200 according to the second embodiment, by focusing on a difference from the switching regulator 100 according to the first embodiment.

The difference in operation is that the operation implemented by the offset voltage source 161 and the switch 162 in the switching regulator 100 according to the first embodiment is implemented by hysteresis inside the PFM comparison circuit 170.

Specifically, the PFM comparison circuit 170 which includes the hysteresis enable terminal 170e is capable of controlling the presence/absence of hysteresis based on the control signal CONT input from the control circuit 123 to the hysteresis enable terminal 170e. The hysteresis is equivalent to a virtual addition of an offset to an input of the PFM comparison circuit 170, and works as if a response delay of the PFM comparison circuit 170 is compensated for as in the first embodiment.

The ripple voltage in the output voltage VOUT can thus be also reduced in the switching regulator 200 according to the second embodiment as in the first embodiment.

The switching regulator 200 according to the second embodiment also accomplishes the virtual addition of the offset to the input of the PFM comparison circuit 170 by configuring the PFM comparison circuit 170 so that the presence/absence of hysteresis can be controlled. The hysteresis in the PFM comparison circuit 170 can be generated relatively easily by, for example, adjusting the size of a differential element that is a component of the PFM comparison circuit 170. The switching regulator 200 therefore has substantially no need to add an element, and has a resultant advantage in that an increase in circuit scale can be avoided, unlike the switching regulator 100 according to the first embodiment in which a constant voltage source, a combination of a resistor and a current source, or the like are added as the offset voltage source 161.

However, the switching regulator 100 according to the first embodiment which uses an offset voltage source is higher in precision than the switching regulator 200 according to the second embodiment. It is therefore preferred to use a suitable one depending on the tolerated precision.

Figure 4:
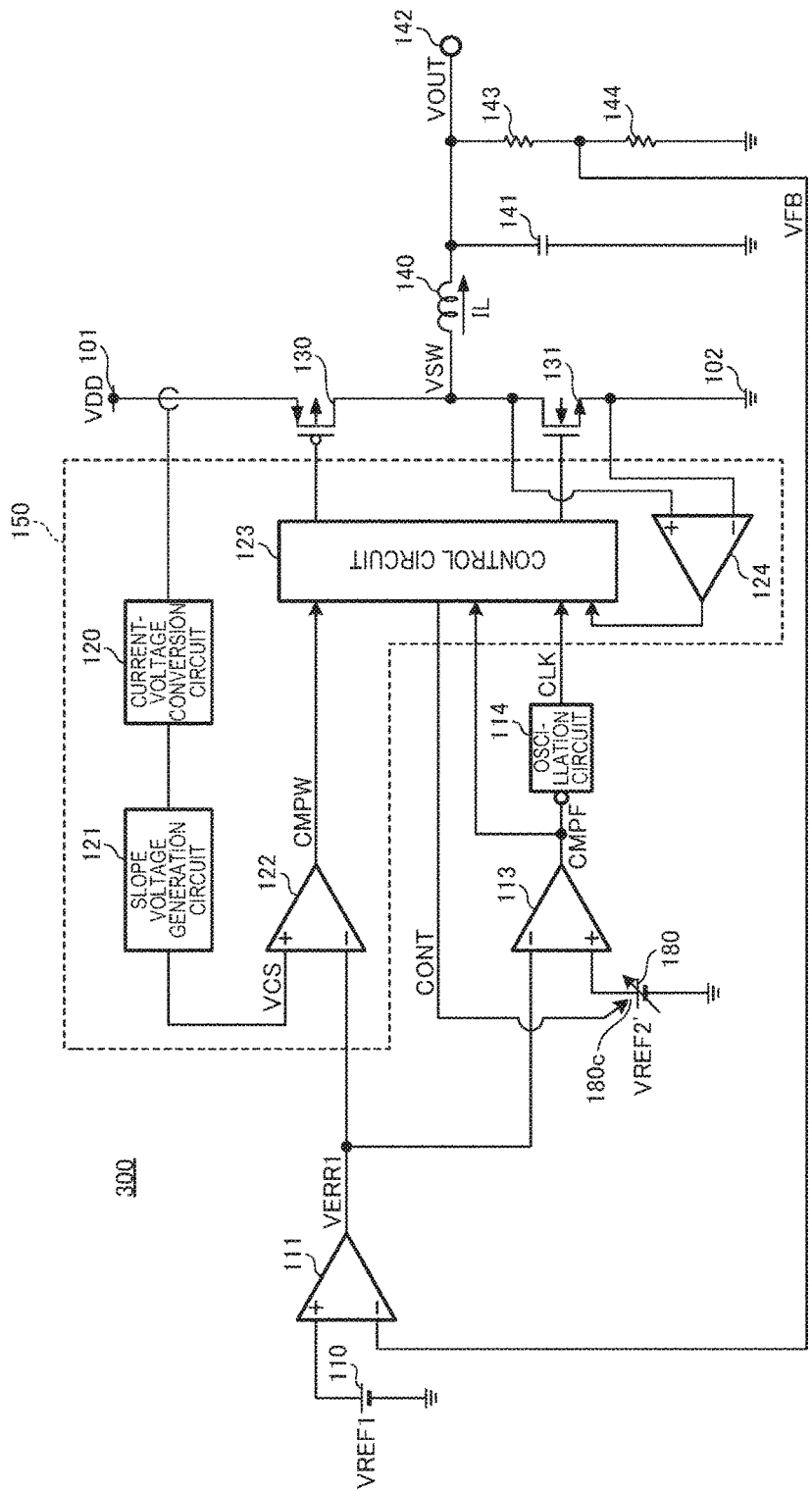
FIG. 4 is a circuit diagram for illustrating a switching regulator according to the third embodiment of the present invention.
Figure 5:
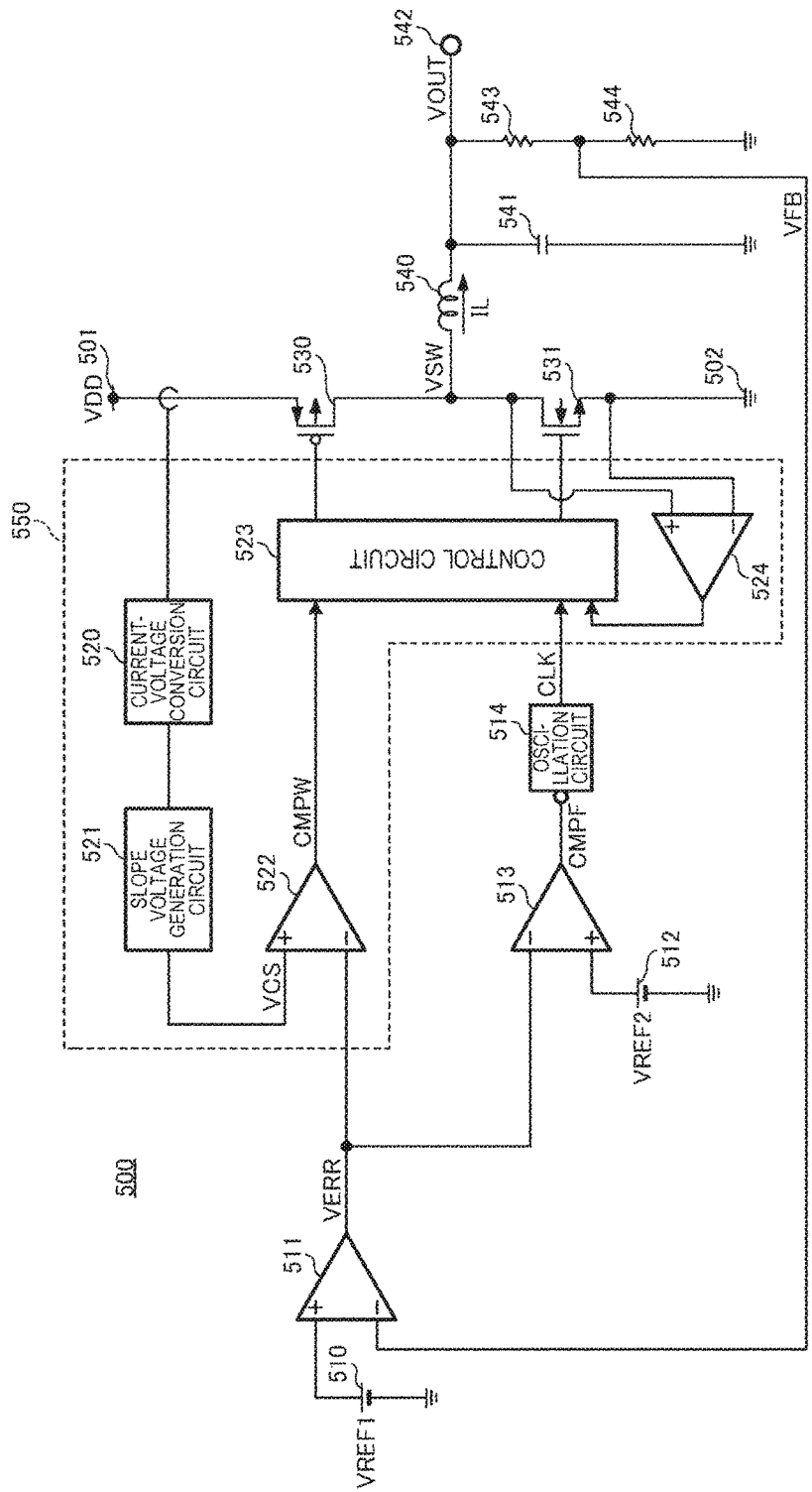
FIG. 5 is a circuit diagram of a switching regulator of the related art.
Figure 6:
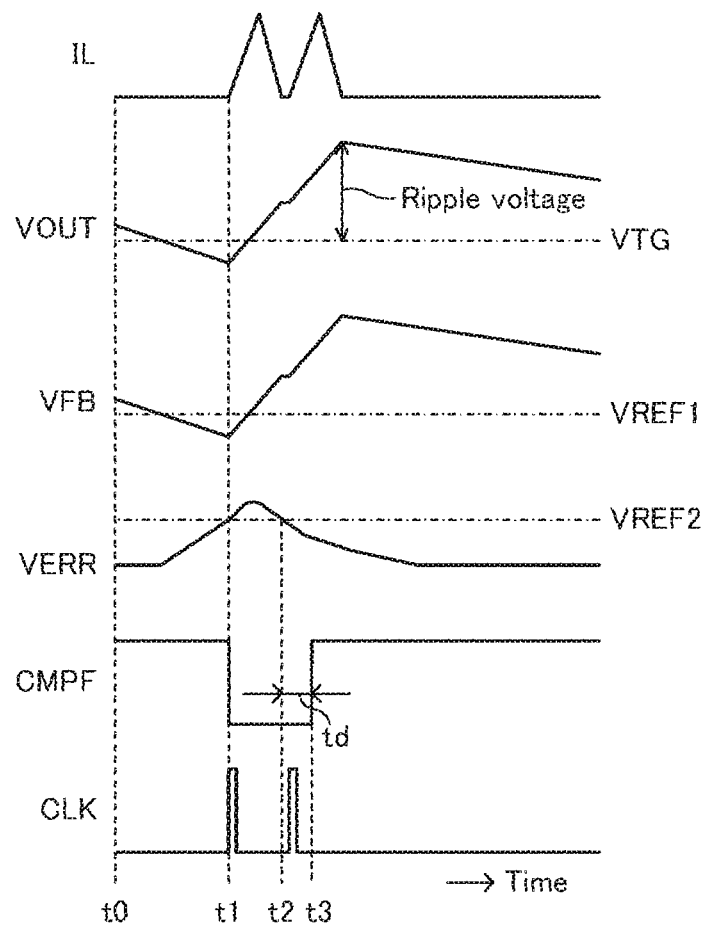
FIG. 6 is a diagram for illustrating the signal waveforms of nodes in the switching regulator of FIG. 5.

A switching regulator 300 according to the third embodiment of the present invention is described next with reference to FIG. 4. The switching regulator 300 according to the third embodiment is configured by removing the offset voltage source 161 and the switch 162 from the switching regulator 100 according to the first embodiment and replacing the reference voltage source 112 with a variable reference voltage source 180.

The rest of the configuration of the switching regulator 300 is the same as that of the switching regulator 100 of FIG. 1, and the same components are therefore denoted by the same reference symbols to omit duplicate descriptions as appropriate.

In the PFM comparison circuit 113, an inverting input terminal is connected to the output of the error amplification circuit 111 and the inverting input terminal of the PWM comparison circuit 122, a non-inverting input terminal is connected to one end of the variable reference voltage source 180. The other end of the variable reference voltage source 180 is connected to the ground terminal 102, and a control input terminal 180c of the variable reference voltage source 180 is connected to the output of the control circuit 123.

A description is given below on the operation of the switching regulator 300 according to the third embodiment, by focusing on a difference from the switching regulator 100 according to the first embodiment.

The difference in operation is that the operation implemented by the offset voltage source 161 and the switch 162 in the switching regulator 100 according to the first embodiment is implemented by switching between two voltage values of a reference voltage generated in the variable reference voltage source 180.

Specifically, the variable reference voltage source 180 which includes the control input terminal 180c is configured so as to vary a reference voltage VREF2' between two arbitrary voltage values, based on the control signal CONT provided from the control circuit 123 to the control input terminal 180c, that is, to switch the reference voltage VREF2' from a first voltage value to a second voltage value which is higher than the first voltage value in response to the change of the comparison result signal CMPF to low level. The varying of the reference voltage VREF2' between two arbitrary values depending on the output of the control circuit 123 is equivalent to a virtual addition of an offset to the input of the PFM comparison circuit 113, and works as if a response delay of the PFM comparison circuit 113 is compensated for as in the first embodiment.

The ripple voltage in the output voltage VOUT can thus be also reduced in the switching regulator 300 according to the third embodiment as in the first embodiment.

The switching regulator 300 according to the third embodiment also accomplishes the virtual addition of an offset to the input of the PFM comparison circuit 113 with the use of the variable reference voltage source 180. In the construction of the reference voltage source connected to the non-inverting input terminal of the PFM comparison circuit 113 with voltage dividing resistors, the variable reference voltage source 180 can be configured easily by simply switching the resistance ratio with a switch. Accordingly, it is recommended to use the switching regulator 300 according to the third embodiment for the reference voltage source connected to the non-inverting input terminal of the PFM comparison circuit 113 with voltage dividing resistors, and to use the switching regulator 100 according to the first embodiment for the reference voltage source connected to the non-inverting input terminal of the PFM comparison circuit 113 without voltage dividing resistors.

Embodiments of the present invention are explained in the above; however, it should be understood that these are exemplary of the invention and are not to be considered as limiting, and that modifications can be made without departing from the scope of the invention.

For instance, while the descriptions of the embodiments given above take a current-mode-control switching regulator as an example, the present invention is applicable also to a voltage-mode-control switching regulator.

The descriptions of the embodiments given above take as an example a case of using MOS transistors as a switching element and a synchronous rectification element. Bipolar transistors or the like may be used instead of MOS transistors.

The embodiments given above take a synchronous rectification-type switching regulator as an example. However, the present invention is applicable also to a diode rectification-type switching regulator. The reverse flow detection circuit is unnecessary in the case of the diode rectification type.

What is claimed is:

1. A switching regulator that controls a switching element connected between a power supply terminal having a power supply voltage and one end of an inductor, and is configured to generate an output voltage at an output terminal that is connected to another end of the inductor, the switching regulator comprising:
    an error amplification circuit configured to amplify a difference between a voltage based on the output voltage and a first reference voltage and to output an error voltage;
    a pulse width modulation (PWM) conversion circuit including a control circuit;
    a pulse frequency modulation (PFM) comparison circuit configured to compare the error voltage with a second reference voltage and to output a comparison result signal to the control circuit at one of a first level and a second level, where an offset voltage is combined with the error voltage by the control circuit and input to the PFM comparison circuit for a given period in response to a change of the comparison result signal from the second level to the first level, the offset voltage having a negative value relative to the second reference voltage; and
    an oscillation circuit configured to output a clock signal of a given frequency according to the first level of the comparison result signal, and to stop outputting the clock signal according to the second level of the comparison result signal,
    wherein the PWM conversion circuit is configured to turn the switching element on at a prescribed pulse width, based on the error voltage and on the output from the oscillation circuit.

2. The switching regulator according to claim 1, wherein the offset voltage applied to an input to the PFM comparison circuit switches the comparison result signal to the second level.

3. The switching regulator according to claim 2, wherein the PFM comparison circuit is configured to switch from a state in which the error voltage is compared with the second reference voltage to a state in which a voltage obtained by adding the offset voltage to the error voltage is compared with the second reference voltage, in response to the change of the comparison result signal from the second level to the first level.

4. The switching regulator according to claim 2, wherein the PFM comparison circuit selects an absence and a presence of a hysteresis and is configured to enter a state in which the PFM comparison circuit has the hysteresis in response to the change of the comparison result signal from the second level to the first level.

5. The switching regulator according to claim 2, wherein the PFM comparison circuit is configured to switch from a state in which the error voltage is compared with the second reference voltage to a state in which the error voltage is compared with a third reference voltage that differs from the second reference voltage in response to the change of the comparison result signal from the second level to the first level.

6. The switching regulator according to claim 1, wherein the PFM comparison circuit is configured to switch from a state in which the error voltage is compared with the second reference voltage to a state in which a voltage obtained by adding the offset voltage to the error voltage is compared with the second reference voltage, in response to the change of the comparison result signal from the second level to the first level.

7. The switching regulator according to claim 1, wherein the PFM comparison circuit selects an absence and a presence of a hysteresis and is configured to enter a state in which the PFM comparison circuit has the hysteresis in response to the change of the comparison result signal from the second level to the first level.

8. The switching regulator according to claim 1, wherein the PFM comparison circuit is configured to switch from a state in which the error voltage is compared with the second reference voltage to a state in which the error voltage is compared with a third reference voltage that differs from the second reference voltage in response to the change of the comparison result signal from the second level to the first level.

* * * * *